US009870067B2

(12) United States Patent
Cho

(10) Patent No.: US 9,870,067 B2
(45) Date of Patent: Jan. 16, 2018

(54) INPUT DEVICE FOR ARABIC LETTERS

(71) Applicant: Don Woo Cho, Seongnam-si (KR)

(72) Inventor: Don Woo Cho, Seongnam-si (KR)

(*) Notice: Subject to any disclaimer, the term of this patent is extended or adjusted under 35 U.S.C. 154(b) by 6 days.

(21) Appl. No.: 14/954,059

(22) Filed: Nov. 30, 2015

(65) Prior Publication Data
US 2017/0003755 A1    Jan. 5, 2017

(30) Foreign Application Priority Data

Jul. 1, 2015   (KR) .................. 10-2015-0094090

(51) Int. Cl.
*G06F 3/02*   (2006.01)
*G06F 3/023*  (2006.01)
*G06F 3/0488* (2013.01)
*G06F 3/01*   (2006.01)

(52) U.S. Cl.
CPC ............ *G06F 3/0236* (2013.01); *G06F 3/018* (2013.01); *G06F 3/02* (2013.01); *G06F 3/0237* (2013.01); *G06F 3/0488* (2013.01)

(58) Field of Classification Search
CPC ... G06F 3/01; G06F 3/02; G06F 3/018; G06F 3/0219; G06F 3/041; G06F 3/023; G06F 3/0236; G06F 3/0237; G06F 3/0484; G06F 3/0488; B41J 15/10; H01H 13/84; H04M 1/23
See application file for complete search history.

(56) References Cited

U.S. PATENT DOCUMENTS

| 4,176,974 A * | 12/1979 | Bishai ................. G06F 17/2863 400/111 |
| 4,527,919 A * | 7/1985 | Aoun ........................ B41J 3/01 178/30 |
| 4,670,842 A * | 6/1987 | Metwaly ................ G09G 5/246 400/111 |
| 8,033,744 B2 * | 10/2011 | Baker ................... G06F 3/0219 400/486 |
| 8,531,405 B2 * | 9/2013 | Khoury .................. G06F 3/018 345/171 |
| 8,858,102 B2 * | 10/2014 | Jiang ..................... G06F 3/0213 400/472 |
| 2006/0100845 A1* | 5/2006 | Mazzagatti ....... G06F 17/30327 703/22 |
| 2008/0258941 A1* | 10/2008 | Oh ......................... G06F 3/018 341/22 |

(Continued)

FOREIGN PATENT DOCUMENTS

KR    10-1077926    10/2011
KR    10-2014-0004849    1/2014

*Primary Examiner* — Matthew G Marini
*Assistant Examiner* — Marissa Ferguson Samreth
(74) *Attorney, Agent, or Firm* — Kile Park Reed & Houtteman PLLC

(57) ABSTRACT

The invention is an input device for Arabic letters installed on key pads of the electrical devices. Arabic letters are divided into the main letters which are the common letter parts or bases of each Arabic letters and the subscripts to be added on the main letters, and inputting operation is implemented in a way that the main letters is inputted first, and the subscripts is inputted later, so the consistency of the input method is maintained, and the number of key operating could be minimized without increasing the number of key.

5 Claims, 16 Drawing Sheets

(56) References Cited

U.S. PATENT DOCUMENTS

| | | | |
|---|---|---|---|
| 2009/0267901 A1* | 10/2009 | Park | G06F 3/018 345/172 |
| 2013/0271382 A1* | 10/2013 | Khan | G06F 3/02 345/171 |
| 2013/0335331 A1* | 12/2013 | Osman | G06F 3/018 345/171 |
| 2014/0191975 A1* | 7/2014 | Chou | G06F 3/018 345/171 |

* cited by examiner

FIG. 1 "Prior Art"

FIG. 5
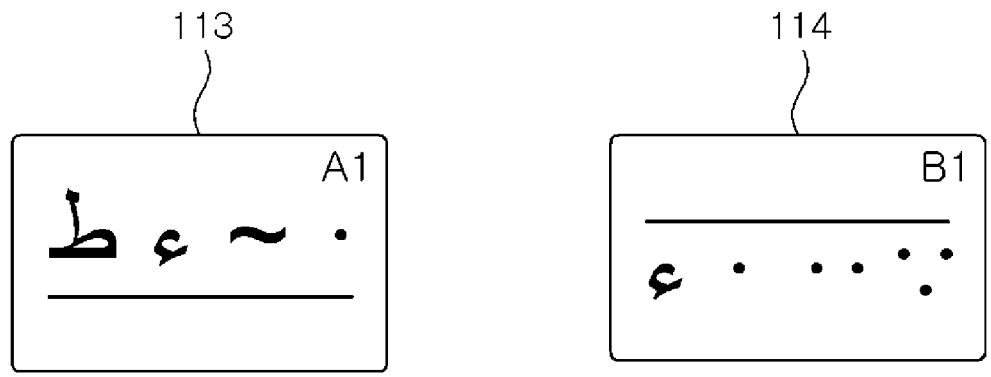
(a)
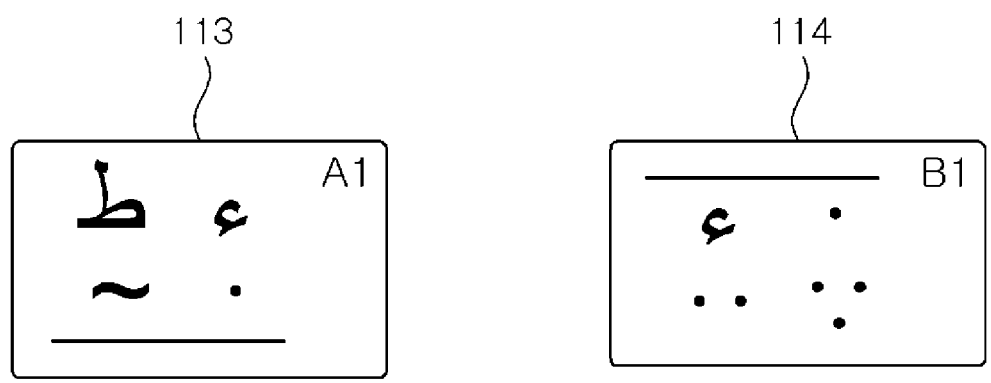
(b)

FIG. 6

| Arabic | Farsi | Urdu |
|---|---|---|
| ا ب ت ث | ا ب پ ت ث | ا ب پ ت ٹ ث |
| ج ح خ د ذ ر ز س ش ص ض ط ظ ع غ ف ق ك ل م ن و ه ي | ج چ ح خ د ذ ر ز ژ س ش ص ض ط ظ ع غ ف ق ک ل م ن و ه ی | ج چ ح خ د ڈ ذ ر ڑ ز ژ س ش ص ض ط ظ ع غ ف ق ک گ ل م ن ں و ہ ھ ء ی ے |

FIG. 7

| NO. | Main Letter | Letter Group | | | Group |
|---|---|---|---|---|---|
| ① | — | — | — | — | G1 |
| ② | ﺝ | ﺝ ﺝ ﺝ ﺝ ﺝ | ﺝ ﺝ ﺝ ﺝ ﺝ | ﺝ ﺝ ﺝ ﺝ | G2 |
| ③ | ﺱ | ﺱ ﺱ ﺱ ﺱ | ﺱ ﺱ ﺱ ﺱ | ﺱ ﺱ ﺱ ﺱ | G3 |
| ④ | ﺩ | ﺩ ﺩ ﺩ | ﺩ ﺩ ﺩ ﺩ | ﺩ ﺩ ﺩ | G4 |
| ⑤ | ﺭ | ﺭ ﺭ ﺭ ﺭ | ﺭ ﺭ ﺭ ﺭ | ﺭ ﺭ ﺭ | G5 |
| ⑥ | ﻁ | ﻁ ﻁ | ﻁ ﻁ | ﻁ ﻁ | G6 |
| ⑦ | ﻉ | ﻉ ﻉ | ﻉ ﻉ | ﻉ ﻉ | G7 |
| ⑧ | ﻑ | ﻑ ﻑ | ﻑ ﻑ | ﻑ ﻑ | G8 |
| ⑨ | ﺹ | ﺹ ﺹ | ﺹ ﺹ | ﺹ ﺹ | G9 |
| ⑩ | ﻭ | ﻭ ﻭ | ﻭ ﻭ | ﻭ ﻭ | G10 |
| ⑪ | ﻙ | ﻙ ﻙ | ﻙ ﻙ | ﻙ | G11 |
| ⑫ | ﻝ | ﻝ | ﻝ | ﻝ | G12 |
| ⑬ | ﻡ | ﻡ | ﻡ | ﻡ | G13 |
| ⑭ | ﻥ | ﻥ | ﻥ | ﻥ | G14 |
| ⑮ | ه | ه | ه | ه | G15 |
| ⑯ | ي | ي | | | G16 |
| ⑰ | ﻯ | ﻯ | ﻯ | ﻯ | G17 |
| ⑱ | ﺀ | ﺀ | | | G18 |

FIG. 8

| No | Ch | Sequence |
|----|----|----|
| 1 | ا | A2 |
| 2 | ب | A3,B1 |
| 3 | ت | A3,A1*A1 |
| 4 | ث | A3,C1 |
| 5 | ج | A3*A3,B1 |
| 6 | ح | A3*A3 |
| 7 | خ | A3*A3,A1 |
| 8 | د | A4*A4 |
| 9 | ذ | A4*A4,A1 |
| 10 | ر | A4 |
| 11 | ز | A4,A1 |
| 12 | س | B2 |
| 13 | ش | B2,C1 |
| 14 | ص | B2*B2 |
| 15 | ض | B2*B2,A1 |
| 16 | ط | B3 |
| 17 | ظ | B3,A1 |
| 18 | ع | B3*B3 |
| 19 | غ | B3*B3,A1 |
| 20 | ف | C3,A1 |
| 21 | ق | C3,A1*A1 |
| 22 | ك | B4*B4 |
| 23 | ل | B4 |

| No | Ch | Sequence |
|----|----|----|
| 24 | م | C2 |
| 25 | ن | C2*C2 |
| 26 | ه | C3*C3 |
| 27 | و | C3 |
| 28 | ي | C4,B1*B1 |
| 29 | أ | A2,A1*A1 |
| 30 | آ | A2,A1*A1*A1 |
| 31 | ! | A2,B1 |
| 32 | ة | C3*C3,A1*A1 |
| 33 | ؤ | C3,A1*A1*A1 |
| 34 | ئ | C4,A1 |
| 35 | ڡ | C3,A1 |
| 36 | ى | C4 |
| 37 | ء | A2*A2 |
| 38 | پ | A3,C1*C1 |
| 39 | چ | A3*A3,C1*C1 |
| 40 | ژ | A4,C1 |
| 41 | گ | B4*B4,A1 |
| 42 | ہ | C3*C3,A1 |
| 43 | ٹ | A3,A1 |
| 44 | ڈ | A4*A4,A1*A1 |
| 45 | ڑ | A4,A1*A1 |
| 46 | ے | C4*C4 |

Groupings on the right side: rows 29–37 bracketed as a; rows 38–42 bracketed as b; rows 43–46 bracketed as c.

FIG. 11

Arabic

| NO. | Main Letter | Letter Group |
|---|---|---|
| ① | ا | ا |
| ② | ل | ل، ڵ، ڶ |
| ③ | ں | ں ں ں |
| ④ | ٮ | ٮ ٮ |
| ⑤ | ر | ر ز |
| ⑥ | ڊ | ڊ ڊ ڊ |
| ⑦ | ص | ص ص |
| ⑧ | ط | ط ط |
| ⑨ | س | س ش |
| ⑩ | ڡ | ڡ ڡ |
| ⑪ | و | و |
| ⑫ | لا | لا |
| ⑬ | ل | ل |
| ⑭ | ع | ع |
| ⑮ | ت | ت |
| ⑯ | ه | ه |
| ⑰ | ء | ء |
| ⑱ | ى | ى ي |

FIG. 13

Farsi

| NO. | Main Letter | Letter Group |
|---|---|---|
| ① | ا | ا |
| ② | ﺝ | ﺝ ﭺ ﺡ ﺥ |
| ③ | ﺏ | ﺏ ﺕ ﺙ ﭖ |
| ④ | ﺩ | ﺩ ﺫ |
| ⑤ | ﺭ | ﺭ ﺯ ﮊ |
| ⑥ | ﻙ | ﻙ ﮒ |
| ⑦ | ﻝ | ﻝ ﻡ ﻥ |
| ⑧ | ﻁ | ﻁ ﻅ |
| ⑨ | ﺱ | ﺱ ﺵ ﺹ ﺽ |
| ⑩ | ﻑ | ﻑ ﻕ |
| ⑪ | و | و |
| ⑫ | ﻯ | ﻯ ﻉ |
| ⑬ | ﭺ | ﭺ |
| ⑭ | ﻉ | ﻉ |
| ⑮ | ﮊ | ﮊ |
| ⑯ | ه | ه |
| ⑰ | ه | ه |
| ⑱ | ی | ی ی |

FIG. 15

Urdu

| Letter Group | Main Letter | NO. |
|---|---|---|
| ۱ | ۱ | ① |
| ا أ ٲ ٳ ٱ ٵ | ا | ② |
| ب ب پ ت ث ٹ | ب | ③ |
| د ڈ ذ | د | ④ |
| ر ز ڑ ژ | ر | ⑤ |
| ج چ ح خ | ج | ⑥ |
| س ش ص ض | س | ⑦ |
| ط ظ | ط | ⑧ |
| ع غ | ع | ⑨ |
| ف ق | ف | ⑩ |
| و | و | ⑪ |
| ک گ | ک | ⑫ |
| ل | ل | ⑬ |
| م | م | ⑭ |
| ن | ن | ⑮ |
| ه | ه | ⑯ |
| ى ي | ى | ⑰ |
| ى | ى | ⑱ |

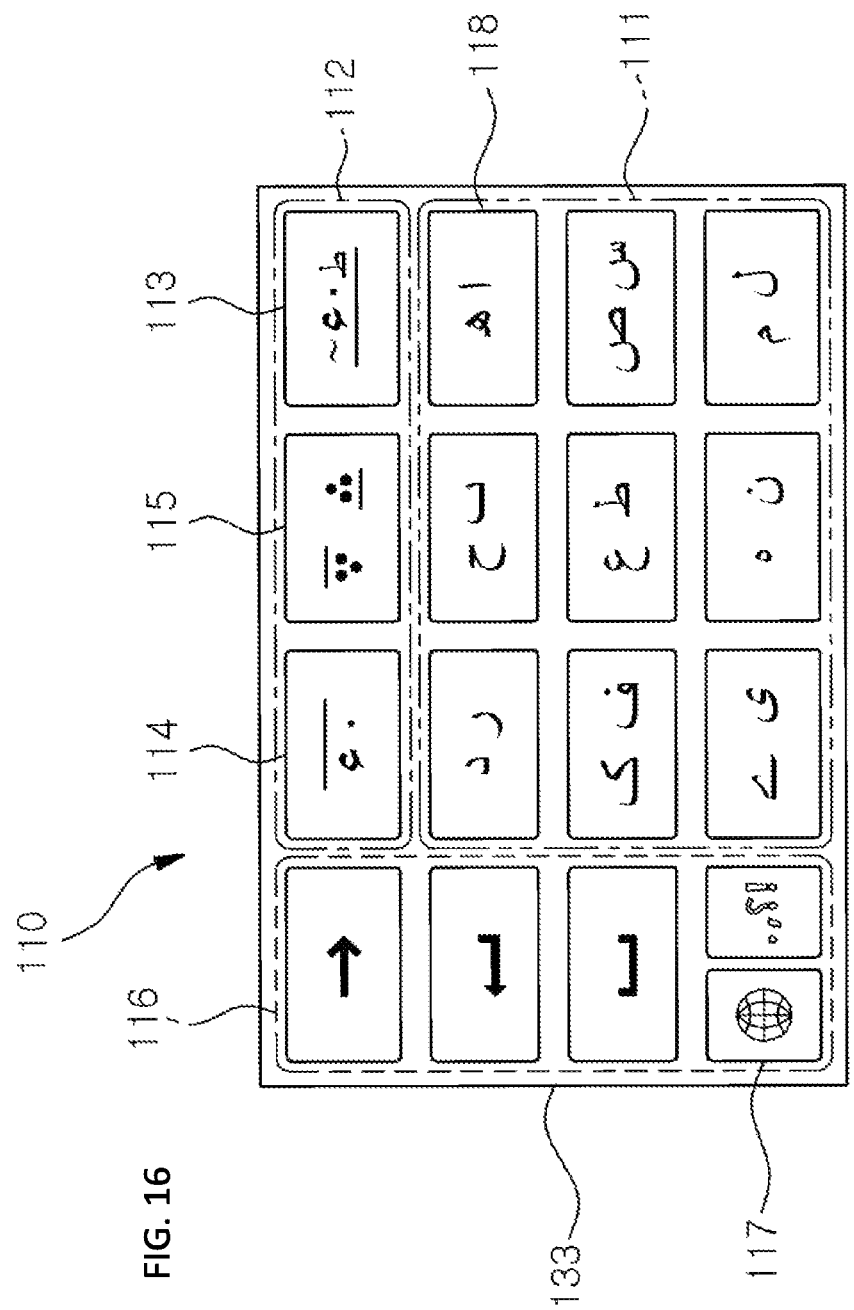

INPUT DEVICE FOR ARABIC LETTERS

TECHNICAL FIELD

The invention relates to an input device for Arabic letters, and more particularly to an input device for Arabic letters which is installed on key pads of the electrical devices including mobile device such as smart phone, tablet, remote controller of TV or broadcast receiving device to input Arabic letters including Arabic, Farsi and Urdu.

BACKGROUND ART

Generally, the keyboards on which Arabic letters are arrayed in QWERTY type are used to input various Arabic letters or alphabets on the PC. But, as the key pad areas are restricted in case of the smart phone or TV remote controller, plural Arabic letters should be assigned on each key button of the key pad and Arabic letter should be selected sequentially by the touching number of key buttons, which is rather troublesome as touching or operating number of key buttons is increased. If we distribute the keys in QWERTY array or if we increase the number of key to evade the above problems, the size of key buttons should be smaller and it will be more difficult to touch of the correct key buttons.

Various attempts have been tried to reduce the number of key operating without increasing the number of the key. FIG. 1 shows the conventional key pad for Arabic letters of one of the above attempt. Referring to FIG. 1, Arabic letters are assigned on the keys in such a way that 9 main letter keys 100 and plural derived letter keys 200 derived from the corresponding main letters are assigned on the key pad, and if any one of the main letters 100 is touched, then the corresponding plural derived letters 200 are shown on the keys adjacent to that main letter key 100, and if any one of the derived letter keys 200 is touched, then that derived letter is selected and inputted.

But the above key pad for Arabic letters has problem that the key location of the derived letters are changed depending on the selected main letters, so that the user may be confused about the key location of the derived letters, so it is difficult for the user to get accustomed to the letter layout of the key pads, which may result in frequent inputting errors or extended input time.

DISCLOSURE

Technical Problem

The invention is suggested to solve the above mentioned problem of the Arabic letters key input system, and the object of the invention is to provide a new input device for Arabic letters in which Arabic consonant letters are divided into the main letters being bases or common letter parts of Arabic letters and the subscripts being added on the main letters, and the main letter is inputted first and the subscript is inputted later so that the consistency of input method could be maintained with the fixed location of the key, and the number of key operating could be minimized without increasing the number of keys.

Technical Solution

According to an aspect of the invention, there is provided an input device for Arabic letters including Arabic, Farsi and Urdu, which comprises;

a key pad 110 which includes a main letter area 111 on which plural main letters being common letter parts commonly included in Arabic consonant letters are assigned in a fixed position of key pad and a subscript area 112 on which plural subscripts being added on each main letter to form complete consonant letters are assigned in a fixed position of key pad, and outputs the corresponding letter input signal according to the user's touch operation;

a controller 120 which outputs display control signals to display the complete consonant letters combined by the selected main letter and the selected subscript according to the letter input signal; and a display 130 which displays each Arabic consonant letter on the display window 131 according to the display control signal from the controller 120.

According to other aspect of the invention, there is provided an input device for Arabic letters, wherein the subscripts are divided into the upper subscripts which are added on the upper part of the main letter and the lower subscripts which are added on the lower part of the main letter, and the subscript area 112 is divided into the upper subscript key 113 on which plural upper subscripts are assigned and the lower subscript key 114 on which plural lower subscripts are assigned, and the controller 120 controls so that the upper subscripts change sequentially according to the predetermined order based on the number of key operating for the upper subscript key 113 and controls so that the lower subscripts change sequentially according to the predetermined order based on the number of key operating for the lower subscript key 114.

According to another aspect of the invention, there is provided an input device for Arabic letters, wherein the upper subscripts including (ء), (ر), (~), (●), (●●), (●●) are divided into the general upper subscripts including (ء), (ر), (~)(●), (●●) and the three point upper subscript of (●●●), and the lower subscripts including (ر), (●), (●●), (●●) are divided into the general lower subscripts including (ر), (●)(●●) and the three point lower subscript of (●●●), and the subscript area 112 is divided into the upper subscript key 113 to input the general upper subscripts sequentially, the lower subscript key 114 to input the general lower subscripts sequentially, and the three point subscript key 115 to input the three point upper subscript and the three point lower subscript alternately.

According to another aspect of the invention, there is provided an input device for Arabic letters, wherein the input device for Arabic letters further includes a position detecting unit 140 detecting whether the display 130 is positioned vertically or horizontally and outputting the detected position signal, and the key pad 110 comprises a touch panel and is shown on the display window 131, and the controller 120 controls to display the key pad 110 in a vertical array mode or a horizontal array mode selectively according the position signal, and the vertical array mode includes the main letter area 111 having 3×3 key array in which three pairs of two main letters are assigned on each key respectively and the subscript area 112 disposed adjacent to the main letter area 111 and having 1×3 or 3×1 key array in which the upper subscript key 113, the lower subscript key 114 and the three point subscript key 115 are assigned on each key respectively, and the horizontal array mode includes the main letter area 111 having 6×3 key array in which each main letter is assigned on each key respectively and the subscript area 112 disposed adjacent to one or both side of the main letter area 111 and having the upper subscript key 113, the lower subscript key 114 and the three point subscript key 115 respectively.

According to another aspect of the invention, there is provided an input device for Arabic letters, wherein the main letters comprise 18 letters (ا), (ب), (ح), (د), (ر), (س), (ص), (ط), (ع), (ك), (ل), (م), (ن), (و), (ه), (ء), (ى), (ـة) which are extracted from 46 Arabic letters covering all the letters of Arabic language, Farsi language and Urdu language.

According to another aspect of the invention, there is provided an input device for Arabic letters including Arabic, Farsi and Urdu, which comprises;

a key pad 110 which includes a main letter area 111 on which plural main letters being common letter parts commonly included in Arabic consonant letters as the same or similar shape are assigned in a fixed position of key pad and a subscript area 112 on which plural subscripts being added on each main letter to form complete consonant letters are assigned in a fixed position of key pad, and outputs the corresponding letter input signal according to the user's touch operation;

a controller 120 which outputs display control signals to display complete consonant letters formed by combining the selected main letter and the selected subscript; and a display 130 which displays each Arabic consonant letter on the display window 131 according to the display control signal from the controller 120.

According to another aspect of the invention, there is provided an input device for Arabic letters, wherein, the key pad 110 further includes a language selection key 117 to select any one among Arabic language, Farsi language and Urdu language, and the main letters extracted from the scope of the Arabic letters used in the Arabic language selected by the language selection key 117 are assigned in the main letter area 111.

According to another aspect of the invention, there is provided an input device for Arabic letters, wherein, if any Arabic letter has no common letter parts of the same or similar shape with all other Arabic letters used in the language selected by the language selection key 117, then that Arabic letter is extracted as a main letter and is assigned on the main letter area 111.

According to another aspect of the invention, there is provided an input device for Arabic letters, wherein the main letters comprise 18 letters (ا), (ب), (ح), (د), (ر), (س), (ص), (ط), (ع), (ف), (و), (ك), (ل), (م), (ن), (ه), (ء), (ى) which are extracted from the scope of Arabic letters used in Arabic language.

According to another aspect of the invention, there is provided an input device for Arabic letters, wherein the main letters comprise 18 letters (ا), (ب), (ح), (د), (ر), (س), (ص), (ط), (ع), (ف), (و), (ك), (ل), (م), (ن), (ه), (ء), (ى), which are extracted from the scope of Arabic letters used in Farsi language.

According to another aspect of the invention, there is provided an input device for Arabic letters, wherein the main letter comprise 18 letters (ا), (ب), (ح), (د), (ر), (س), (ص), (ط), (ع), (ف), (و), (ك), (ل), (م), (ه), (ه), (ى) (ـة), which are extracted from the scope of Arabic letters used in Urdu language.

According to another aspect of the invention, there is provided an input device for Arabic letters, wherein the subscripts are divided into the upper subscripts which are added on the upper part of the main letter and the lower subscripts which are added on the lower part of the main letter, and the subscript area 112 is divided into the upper subscript key 113 on which plural upper subscripts are assigned and the lower subscript key 114 on which plural lower subscripts are assigned, and the controller 120 controls so that the upper subscripts change sequentially according to the predetermined order based on the key operating number of the upper subscript key 113 and controls so that the lower subscripts change sequentially according to the predetermined order based on the key operating number of the lower subscript key 114.

According to another aspect of the invention, there is provided an input device for Arabic letters, wherein the controller 120 controls that the subscripts are displayed in predetermined sequence according to the operating number of the upper subscript key 113 or the lower subscript key 114 for the corresponding main letter, and only the subscripts which can be grammatically combined with the corresponding main letter should be displayed sequentially.

Advantageous Effect

According to the invention, as Arabic consonant letters are divided into the main letters which are bases or common letter parts commonly included in Arabic consonant letters and the subscripts which are added to the main letters to form complete consonant letters, and the main letter is inputted first and the subscript is inputted later so that the consistency of input method could be maintained with the fixed key location, and the number of key operating could be minimized without increasing the number of keys.

And, as the plural main letters extracted from Arabic consonant letters are fixedly assigned on the keys in the predetermined main letter area 111 of the key pad 110, and the plural subscripts are also fixedly assigned on the keys in the predetermined subscript area 112 of the key pad 110, the user can get easily accustomed to the layout of the key pad, and the predictive letter inputting is possible, so the time of inputting Arabic letters can be much reduced.

And, the subscripts are divided into the upper subscripts which are added on the upper part of the main letter and the lower subscripts which are added on the lower part of the main letter, and the upper subscripts are assigned on the upper subscript key 113 and the lower subscripts are assigned on the lower subscript key 114 respectively, the layout of the subscripts key can be optimized to the feature of Arabic letters in which the subscripts are added in the upper part or lower part selectively, so the number of keys and the number of key operating can be greatly reduced.

And, as the upper subscripts or the lower subscripts are sequentially changed on the display 130 according to the predetermined order based on the number of key operating of the upper subscript key 113 or the lower subscript key 114, and certain subscripts which cannot be added on certain main letters can be omitted and only the addible subscripts can be displayed for the corresponding main letters sequentially, so the key operating time or key operating number can be much reduced.

And, as the upper subscripts including (), (), (), (●), (●●), () are divided into the general upper subscripts including (), (), (), (●), (●●) and the three point upper subscript of (), the lower subscripts including (), (●), (●●)() are divided into the general lower subscripts including (), (●), (●●) and the three point lower subscript of (), and the subscript area 112 is divided into the upper subscript key 113 to input the general upper subscripts sequentially, the lower subscript key 114 to input the general lower subscripts sequentially, and the three point subscript key 115 to input the three point upper subscript and the three point lower subscript alternately, in case that the dot subscript (●), (●●), () or () are sequentially changed according to the number of key operating, the operating number of the three point upper subscript or the three point lower subscript can be reduced to 1 or 2 times instead of 3 times, and the operating number for the general upper or lower subscripts also can be reduced.

And, as the position detecting unit 140 detects whether the display 130 is positioned vertically or horizontally, and the vertical array mode having 3×3 main letter area 111 in which three pairs of two main letters are assigned on each key respectively and the horizontal array mode having 6×3 main letter area 111 in which each main letter is assigned on each key respectively can be selectively displayed on the display 130, the use's convenience can be enhanced.

And, as the main letters comprise 18 letters (), (), (), (), (), (), (), (), which are extracted from 46 Arabic consonant letters covering all the letters of Arabic language, Farsi language and Urdu language, all of 3 Arabic language letters can be inputted by one input device of the invention. In addition, a language selection key 117 is disposed on one side of the key pad 110 which can select any one among Arabic, Farsi and Urdu, and if any one among 3 Arabic languages is selected, then the unnecessary main letters or subscripts for the selected Arabic language can be removed from the usable letters, so the unnecessary increase of the key operating number or input time can be effectively prevented.

DESCRIPTION OF THE DRAWINGS

FIG. 5 is a view of the upper subscript key and the lower subscript key of the preferred embodiment of the invention FIG. 6 is a table of letters lists of Arabic, Farsi and Urdu FIG. 7 is a table of the letter groups classified by the common letter parts and the main letter representing each letter group according to the embodiment of the invention FIG. 8 is a table showing key operating order for Arabic letters according to the embodiment of the invention FIG. 11 is a table of the letter groups classified by the common letter parts and the main letter representing each letter group for Arabic language according to another embodiment of the invention

FIG. 13 is a table of the letter groups classified by the common letter parts and the main letter representing each letter group for Farsi language according to another embodiment of the invention

FIG. 15 is a table of the letter groups classified by the common letter parts and the main letter representing each letter group for Urdu language according to another embodiment of the invention FIG. 16 is a view of the key pad layout of the embodiment of FIG. 15

DETAILED DESCRIPTION OF THE INVENTION

Hereinafter, the preferred embodiments of the invention will be described with reference to the drawings.

The term 'Arabic letters' means the letters used in the pan-Arab languages including Arabic language, Farsi language, Urdu language, their derivatives, and their cursive scripts.

The term 'main letter' means the base or common letter part which is included commonly in Arabic consonant letters and extracted from them in respect of the common features of the letter shapes. That is, the main letters are the common letter parts commonly included in Arabic consonant letters as the same or similar shape. The main letter can be a complete Arabic letter independently or can be a part of an Arabic letter. Generally, in Arabic world, the consonants are mainly used in the ordinary life and the vowels are used in the restricted area such as Quran and education.

The term 'subscript' means the part of letter to be added to the main letters to form complete Arabic consonant letters. The term 'derived letter' means the letter combined by certain main letter and the corresponding subscript to be inputted finally by the input device 100 of the invention.

Figure 2:
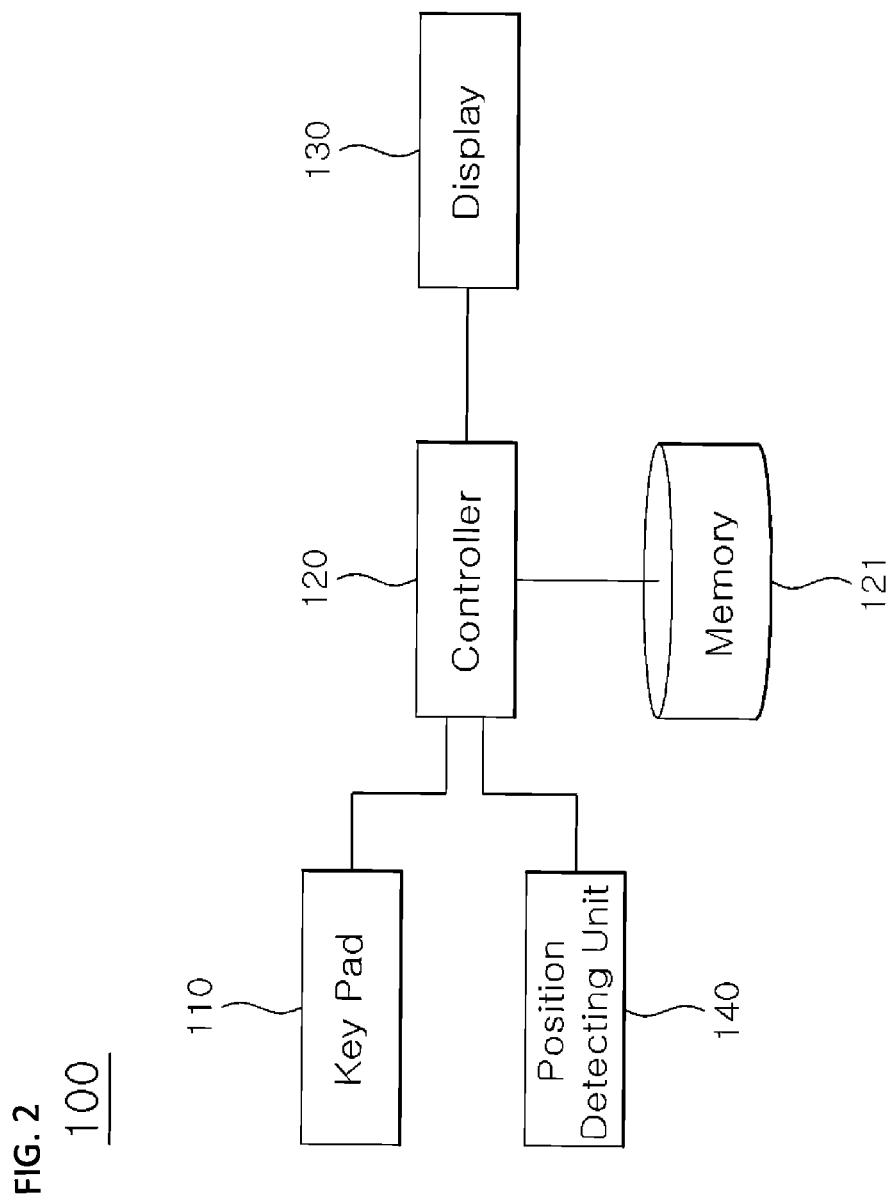
FIG. 2 is a block diagram of the preferred embodiment of the invention

According the input device of Arabic letters of the preferred embodiment of the invention, Arabic consonant letters is divided into the main letters which is the common letter parts or bases of each Arabic letters and the subscripts to be added on the main letters, and inputting operation is implemented in a way that the main letters is inputted first, and the subscripts is inputted later, so the consistency of the input method is maintained, and the number of key operating could be minimized without increasing the number of key. The input device 100 of the invention includes a key pad 110, a controller 120 and a display 130 as shown in FIG. 2 and FIG. 3.

Figure 3:
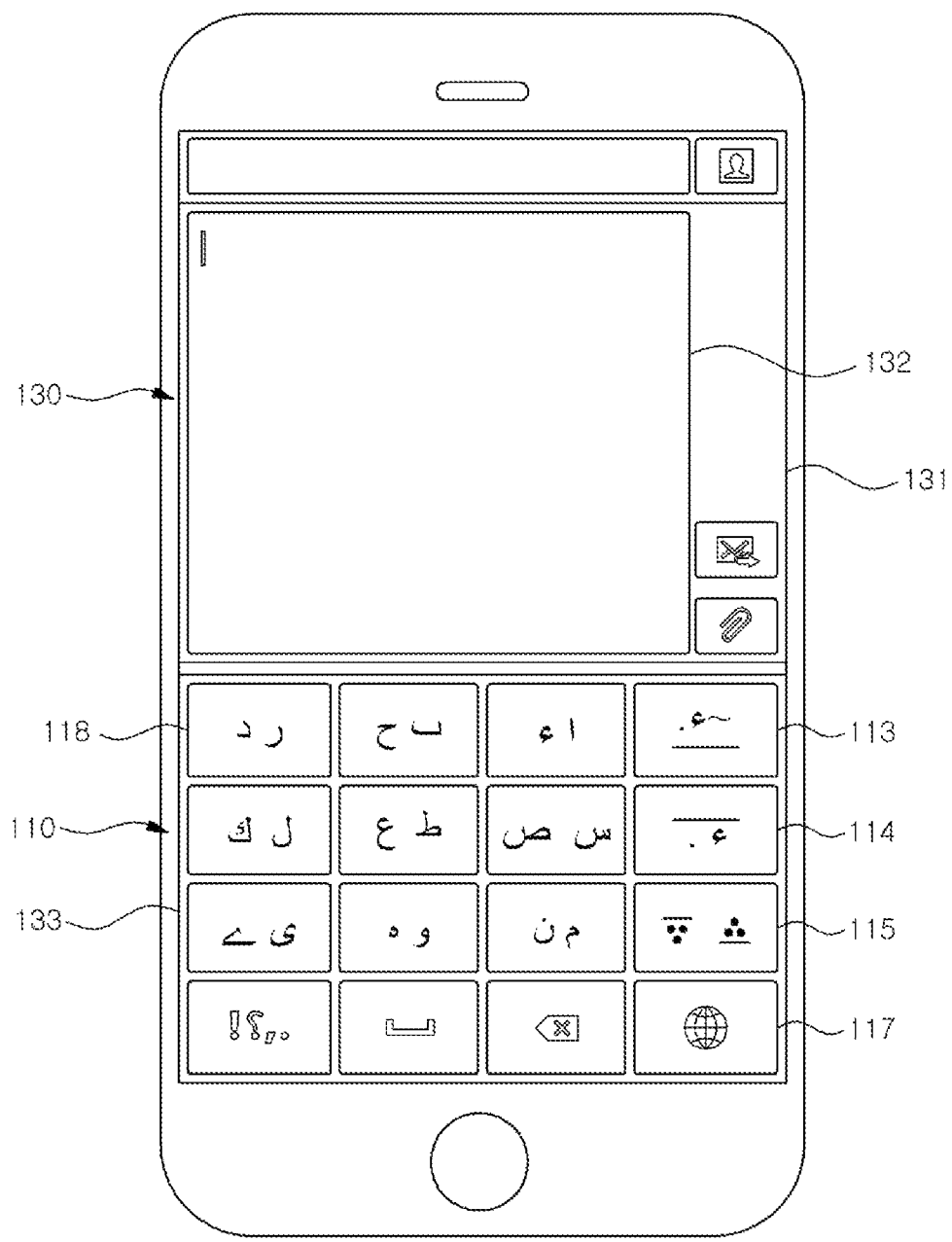
FIG. 3 is a front view of mobile device on which the input device of Arabic letters of the preferred embodiment of the invention is installed
Figure 4:
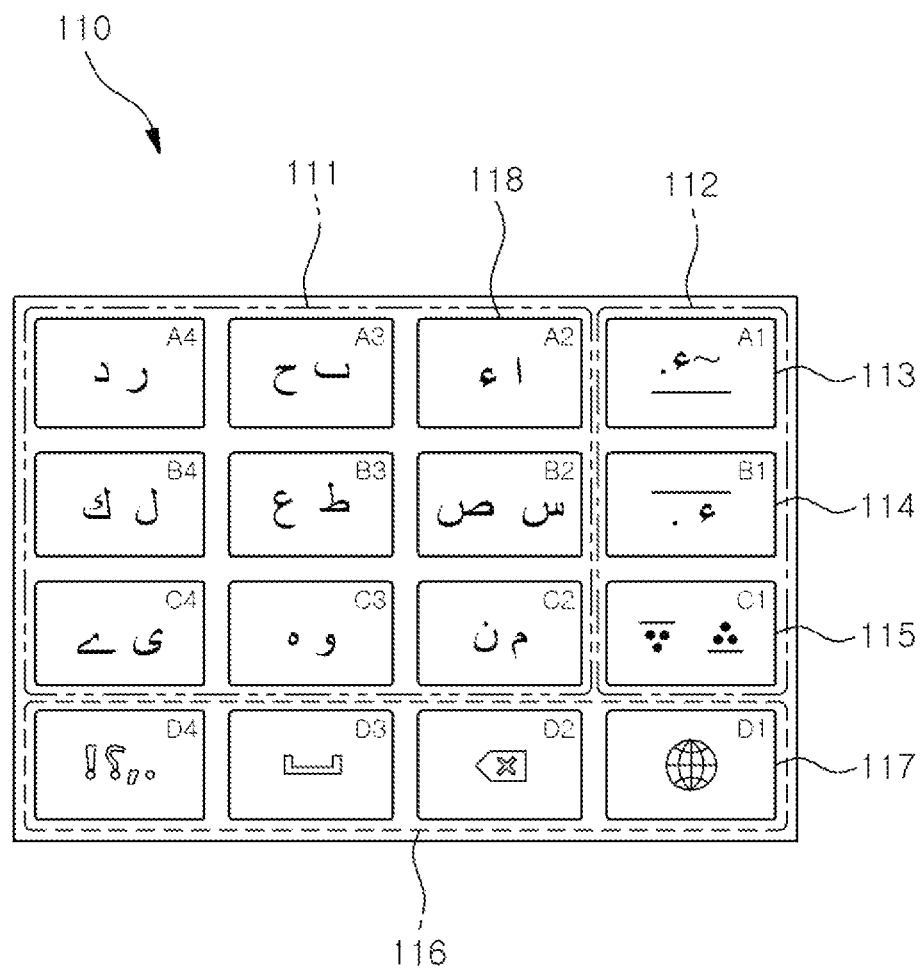
FIG. 4 is a view of the key pad layout of the preferred embodiment of the invention

Referring to FIG. 3 and FIG. 4, the key pad 110 is an input means in which the keys are arrayed in a predetermined manner to input Arabic letters, and includes a main letter area 111 in which plural main letters included commonly in Arabic letters or extracted from Arabic letter in respect of the common features of the letter shapes are assigned and an subscript area 112 in which plural subscripts to be added on the main letters to form various derided letters are assigned, and outputs the letter input signal according to the user's key touch operation.

The key pad 110 may be a push button key pad, that is, a hard-wired key pad separated from the display such as ordinary TV remote controller, or it may be a soft key pad such as a touch panel to be displayed on the display window 131 of the display 130. If a main letter key 118 assigned on the main letter area 111 is touched or operated, the main letter input signal corresponding to the touched main letter key 118 is generated, and if an subscript key 113 to 115 assigned on the subscript area 112 is touched, the subscript input signal corresponding to the touched subscript key is generated, and the generated letter input signals are transmitted to the controller 120.

FIG. 6 shows the letters lists of Arabic, Farsi and Urdu language as typical Arabic letters in alphabetical order form right to left, and FIG. 7 shows the letter groups classified by the common letter parts and the main letters representing each letter group. As shown in FIG. 6, Arabic language generally comprises 28 consonant letters or alphabets, and Farsi language further includes 4 letters as shown in the dotted box in addition to the above 28 letters of Arabic language, and Urdu language further includes 4 letters as shown in the solid box in addition to the above 32 letters of Farsi language.

Though not shown in FIG. 6, the Arabic letters may further include 9 extended letters such as (  ), ( ء ), (  ), (  ), (  ), (  ), (  ), (  ), ( ) in addition to the above 28 Arabic letters, and the Farsi and Urdu letters may still further includes one extended letter of ( ) in addition to the above 9 extended letters to have total 10 extended letters. That is, the above 3 Arabic languages can use totally 46 letters inclusive of 36 letters of FIG. 6 and the above 10 extended letters.

According to the preferred embodiment of the invention, as shown in FIG. 7, the 18 letter groups G1 to G18 are classified by the criteria of the common letter parts which are commonly included in Arabic letters (16 groups in only Arabic or only Farsi), and the main letters representing each letter group are 18 letters such as ( ), ( ) ( ), ( ), ( ), ( ), ( ), ( ), ( ), ( ), ( ), ( ), ( ), ( ), ( ), ( ), ( ), ( ).

If Arabic or Farsi is to be inputted, then 16 main letters except ( ) and ( ) used only in Urdu can be used selectively.

In addition, the subscripts are extracted to be added to the main letters to form complete consonant letters, these subscripts are 7 letters including ( ), ( ), ( ), ( ), ( ), ( ), (z,509 ).

Referring to FIG. 4, the key pad 110 includes a function key area 116 having function keys to implement additional functions besides the main letter area 111 and the subscript area 112. The function keys may include a language conversion key 117 converting from Arabic letters to English letters or other language letters, a delete key to delete the string of the inputted letters, a space key to input the blank between the letters or symbol keys to input various symbols.

The controller 120 is to treat the inputted data or signals to implement the functions of input device for Arabic letter, and output the display control signal to display the selected main letter independently or a derived letter combined by a selected main letter and the selected subscript. More particularly, the controller 120 includes a memory 121 which saves the program data to generate Arabic letters based on the inputted signal from the letter keys arrayed on the key pad 110, read out the data matching with the letter input signal from the key pad 110 and output the display control signal to display the corresponding Arabic letter.

Referring to FIG. 7, in case of inputting a Arabic letter such as ( ) which is identical with the corresponding main letter itself, the user can finish it by operating the main letter key matching with the main letter corresponding to that Arabic letter, but in case of inputting a main letter such as ( ) which does not form a Arabic letter independently by itself, the user should operate the main letter key matching with the main letter corresponding to that Arabic letter first, and operate the subscript key matching with the subscript to be added with in a predetermined time, then the derived letter combined with that main letter and the corresponding subscript may be inputted and displayed. The predetermined time is a limit time to decide whether the sequentially inputted Arabic letters should be displayed independently or combinedly.

The display 130 is a means to display the Arabic letters processed based on the letter input signal inputted by operating the key pad 110, and display the corresponding Arabic letters on the display window 131 according to the display control signal from the controller 120. As shown in FIG. 3, the display window 131 includes a letter display window 122 to display the Arabic letters inputted by operating the key pad 110 and, in case that the key pad 110 is touch panel, a key pad display window 133 may be displayed on one side of the display window 122.

According to the invention which comprises the above key pad 10, the controller 120 and the display 130, Arabic letters are divided into the main letters which are bases or common features of overall shapes of Arabic letters (common letter parts commonly included in Arabic letters) and the subscript which are added to the main letters to form a derived letters, and the main letters are inputted first and the subscripts are inputted later to be combined the firstly inputted main letters, so that the consistency of input method could be maintained, and the necessary number of key operating is minimized without increasing the number of keys.

And, differently to the conventional input method in which the positions of derived letter keys are changed according to the selected main letters, the main letters are assigned on the fixed position of the predetermined main letter area 111, and the subscripts are also assigned on the fixed position of the predetermined subscript area 112, so the user can easily get accustomed to the key layout of the key pad, and the predictive letter inputting is possible and the inputting time can be sufficiently reduced.

Also, as shown in FIG. 4, the subscripts are divided into the plural upper subscripts which are added to the upper part of the main letters and the plural lower subscripts which are added to the lower part (or middle part) of the main letters, and the subscript area 112 may include the upper subscript key 113 to input the plural upper subscripts and the lower subscript key 114 to input the plural lower subscripts. The controller 120 controls so that the upper subscripts are changed sequentially in the predetermined order according to the key operating number, and controls so that the lower subscripts are changed sequentially in the predetermined order according to the key operating number. In case that the upper subscripts are predetermined to be changed in the order of (⏃), (ࡘ), (~), (●), (●●), (●●), and any main letter is inputted first and the upper subscript key 113 is operated later within a predetermined time, then the upper subscript will be added to that main letter as being changed sequentially in the order of (⏃), (ࡘ), (~), (●), (●●), (●●). For example, if the upper subscript key 113 is operated one time, then (⏃) will be added, and if the upper subscript key 113 is operated two times, then (ࡘ) will be added.

Likewise, in case that the lower subscripts are predetermined to be changed in the order of (ࡘ), (●), (●●), (●●), and any main letter is input first and the lower subscript key 114 is operated later within a predetermined time, then lower subscript will be added to that main letter as being changed sequentially in the order of (ࡘ), (●), (●●), (●●).

As shown in FIG. 3 and FIG. 4, the image or symbol of the representative subscript among the subscripts to be inputted by the corresponding key can be marked on the upper subscript key 113 and the lower subscript key, or as shown in FIG. 5, the images or symbols of all the subscripts to be inputted by the corresponding key can be marked in a predetermined order. The images or symbols of the subscripts can be sequenced horizontally as shown in FIG. 5(*a*) or on multistage as shown in FIG. 5(*b*).

Referring to FIG. 7, all of the above mentioned 6 upper subscripts or 4 lower subscripts are not used to each main letter, but the usable upper subscripts or lower subscripts are restricted depending on the main letters. Therefore, if all the 6 or 4 subscripts are inputted to be added on each main letter sequentially, then nonexistent derived letters may be generated and the number of key operating to input the subscripts will be increased. To avoid the above problems, the controller 120 according to the invention will control to display only the usable upper subscripts sequentially when the upper subscript key 113 is operated after any main letter is inputted, and will control to display only the usable lower subscripts sequentially when the lower subscript key 114 is operated after any main letter is inputted.

For example, referring to FIG. 7, if the main letter (⎯) is inputted, the usable 3 upper subscripts (⏃), (●), (●●) among all 6 upper subscripts are displayed sequentially. Accordingly, if the main letter key 118 corresponding to the main letter (⎯) is operated and the upper subscript key 113 is operated one time, then the derived letter (⏃) combined by the upper subscript (⏃) will be displayed or inputted. If the upper subscript key 113 is operated two times, then (ࡘ), (~), (●) are not used, and the derived letter (●●) combined by the upper subscript (●●) will be displayed or inputted. As mentioned above, the subscripts are sequentially changed based on the firstly inputted main letter on the predetermined order, and non-usable subscripts are omitted and only usable subscripts are displayed sequentially, so the number or time of key operating can be more reduced.

According to the preferred embodiment of the invention, in case that the subscripts (●), (●●), (●●), (●●) are predetermined to be inputted sequentially by the number of key operating, the three point subscript (●●), (●●) which may increase the number of key operating is preferably assigned on a separate key, so the number of key operating can be highly reduced. For this purpose, the upper subscripts of (⏃), (ࡘ), (~), (●), (●●), (●●) are divided into the general upper subscripts including (⏃), (ࡘ), (~), (●), (●●) and the three point upper subscript of (●●). Likewise, the lower subscripts of (ࡘ), (●), (●●), (●●) are divided into the general lower subscripts including (ࡘ), (●), (●●) and the three point lower subscript of (●●).

In addition, as shown in FIG. 3 and FIG. 4, the subscript area 112 is comprised of the upper subscript key 113 to input the general upper subscripts sequentially, the lower subscript key 114 to input the general lower subscripts sequentially, and the three point subscript key 115 to input the three point upper subscript and the three point lower subscript alternately. Accordingly, the three point upper subscript or lower subscript can be input by one or two time key operating, not three or more time key operating, and the number of changing of the general upper subscripts or the general lower subscripts is reduced, which will reduce the key operating time effectively.

Meanwhile, the preferred embodiment of the invention further includes a position detecting unit 140 to detect whether the display 130 is positioned vertically or horizontally and output the detected position signal. In this case, the key pad 110 comprises a touch panel and may be shown in the display window 131 of the display 130. The controller 120 can control to display the key pad 110 in a vertical array mode or a horizontal array mode selectively according the position signal.

Figure 10:
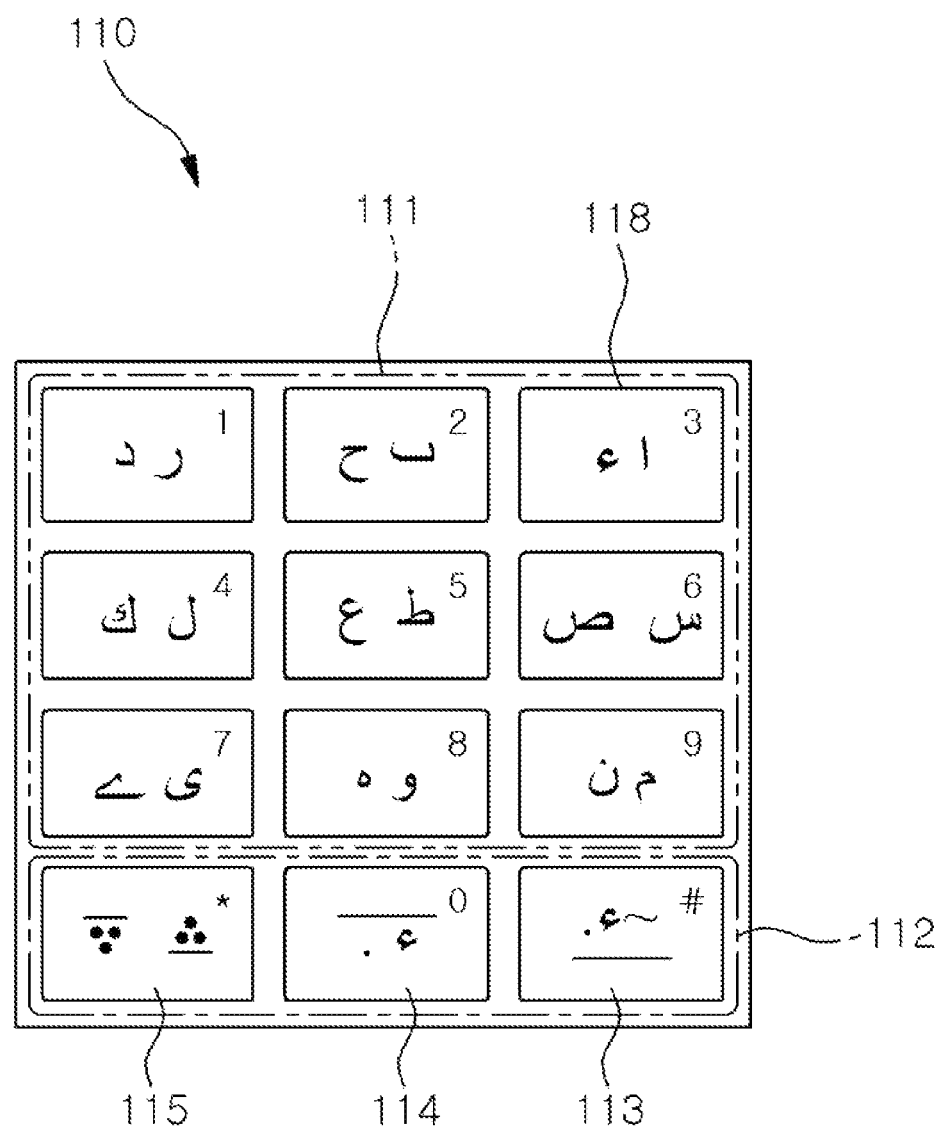
FIG. 10 is a view of the key pad array of the other embodiment of the invention

As shown in FIG. 4 and FIG. 10, the vertical array mode includes the main letter area 111 having 3×3 key array in which three pairs of two main letters are assigned on each key respectively and the subscript area 112 disposed adjacent to the main letter area 111 and having 1×3 or 3×1 key array in which the upper subscript key 113, the lower subscript key 114 and the three point subscript key 115 are assigned respectively.

Figure 9:
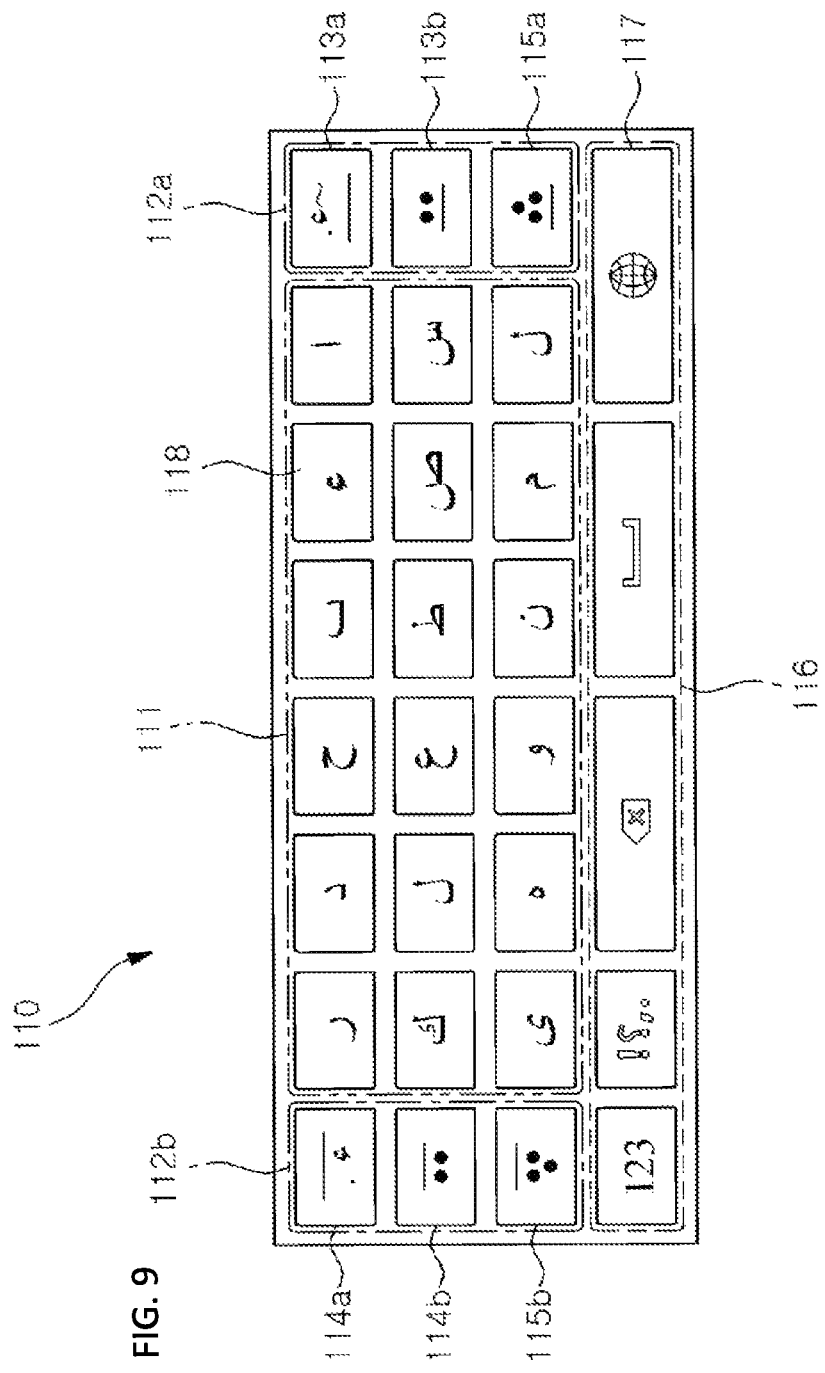
FIG. 9 is a view of the horizontal array mode key pad of the embodiment of the invention

As shown in FIG. 9, the horizontal array mode includes the main letter area 111 having 6×3 key array in which each main letter is assigned on each key respectively and the subscript area 112 disposed adjacent to one or both side of the main letter area 111 and having the upper subscript key 113, the lower subscript key 114 and the three point subscript key 115 respectively.

Accordingly, if the position detecting unit 140 detects the use of device in a vertical position while used in the horizontal array mode, then the controller 120 will change into the vertical array mode automatically so as to provide an optimized condition for inputting Arabic letters.

As shown in FIG. 9, in the horizontal array mode, the two point upper subscript and the two point lower subscript (● ●), which are treated as the general upper subscript or the general lower subscript in the vertical array mode, can be assigned on the separate two point upper subscript key 113b and two point lower subscript key 114b. And, the three point upper subscript (●●●) and the three point lower subscript (●●●), which are assigned commonly on the three point subscript key 115 in the vertical array mode, can be assigned on the separate three point upper subscript key 115a and three point lower subscript key 115, so the number of key operating can be more reduced.

Meanwhile, as the main letters are comprised of 18 letters including (ا), (ب), (ح), (د), (ر), (س), (ص), (ط), (ع), (ك), (ل), (م), (ن), (و), (ه), (ء), (ى), (ـه) extracted from 46 Arabic letters covering all the letters of Arabic language, Farsi language, and Urdu language, it will be possible to input all the letters of the above three languages by one input device of the invention.

In addition, the preferred embodiment of the invention further includes a language selection key 117 disposed on one side of the key pad 110 which can select any one among Arabic, Farsi and Urdu languages, and if any one among above 3 languages is selected by this language selection key 117, then the unnecessary main letters or subscripts for the selected language can be removed from the usable letters, so the unnecessary increase of the number of key operation or input time can be effectively prevented.

For example, in case that the input device for Arabic letters 100 according to the invention is used as the device dedicated to Arabic or Farsi, then 16 main letters (ا), (ب), (ب), (ح), (د), (ر), (س), (ص), (ط), (ع), (ك), (ل), (م), (ن), (و), (ى), except (ـه) and (ء) from the above 18 main letters can be used, and the upper subscripts or lower subscripts are also restricted to ones usable on the really existing derived letters, so the number or time of key operating can be more reduced.

FIG. 8 is a table showing the key operating order for Arabic letters. The item 'No' is a serial number of Arabic letters or Alphabets, the item 'Ch' is the Arabic letter, and the item 'Sequence' is an order of operating the key shown in FIG. 4. And, the letters in the range 'a' (No 29 to 37) are the extended letters dedicated to Arabic language, and the letters in the range (No 38 to 42) are the extended letters dedicated to Farsi language, and the letters in the range 'c'(No 43 to 46) are the extended letters dedicated to Urdu language.

For example, in order to input Arabic letter No 3 (ت) the user firstly operates key A3 of the main letter key 118 in FIG. 4 to input the main letter (ب), then operates key A1 of the upper subscript key 113 two times continuously within a predetermined time. In order to input Arabic letter No 15 (ض) the user firstly operates key B2 of the main letter key 118 two times continuously to input the main letter (ص), then operates key A1 of the upper subscript key 113 one time.

And, in order to input Arabic letter No 30 (أ), the user firstly operates key A2 of the main letter key 118 in FIG. 4 to input the main letter (ا), then operates key A1 of the upper subscript key 113 three times continuously within a predetermined time. In order to input Arabic letter No 37 (ج) the user firstly operates key A3 of the main letter key 118 two times continuously to input the main letter (ح) then operates key C1 of the lower subscript key 114 two times continuously.

According to the invention as described above, contrary to the conventional key pad for Arabic letters in which the key location of the derived letters are changed depending on the touched main letters, the main letters extracted from the common letter parts of the Arabic letters are fixedly assigned on key in the predetermined main area 111 of the key pad 100, and the plural subscripts being added to the main letters to form various derived letters are also fixed assigned on the key in the predetermined subscript area 112 of the key pad 110, the user can get accustomed to the layout of the key pad 110 easily, and the predictive letter input is possible, so the time of key operating to input Arabic letters can be much reduced.

Meanwhile, according to the other embodiment of the invention, the input device of Arabic letters can extract the main letters from the common letter parts which are included in any Arabic language as the similar common shape as well as the same common shape. For example, Arabic letters (ف) and (ق) in FIG. 11 actually do not include the common letter part of the same shape to each other, but it can be said that they include the common letter part of the similar shape in that they commonly have small circle on the right and stroke extending leftward from the lower part of the small circle. In this respect, the common letter part (ف) included in the two Arabic letters as a similar common shape can be extracted as a main letter.

In addition, referring to FIG. 15, it can be said that the Arabic letters (ب), (ت), (ث), (پ), (ط), (ن) are similar in that stroke extends downward from the starting point on the right and extends horizontally to the left and then upward shortly. So the common letter part (ـب) with similar shape can be extracted as a main letter.

As mentioned above, if the number of the main letters extracted from the Arabic letters based on the common letter part with the same shape is larger than the key number of the main letter area 111, then the main letter can be extracted based on the common letter part with the similar shape in order to reduce the number of the main letters. In this case, the scope of the similar shape of the common letter parts should be determined on condition that the user can easily analogize the matched Arabic letters from the corresponding main letters.

Referring FIGS. 11, 13 and 15, it can be said that (ا), (و), (ك), (ل), (م), (ن), (ه), (ع), (ه), (ى), (ـة) have no common letter parts with the same or similar common shape among themselves. In this case, these Arabic letters can be extracted as independent main letters and assigned on the main letter area 111 of the key pad 110.

According to another aspect of the invention, the key pad 110 further includes a language selection key 117 to select any one among Arabic language, Farsi language and Urdu language. If the user select any language by touching the language selection key 117, then unnecessary main letters or subscripts for that language are prevented from being displayed on the key pad 110, so unnecessary increase of number and time of key operation can be effectively prevented.

Figure 1:
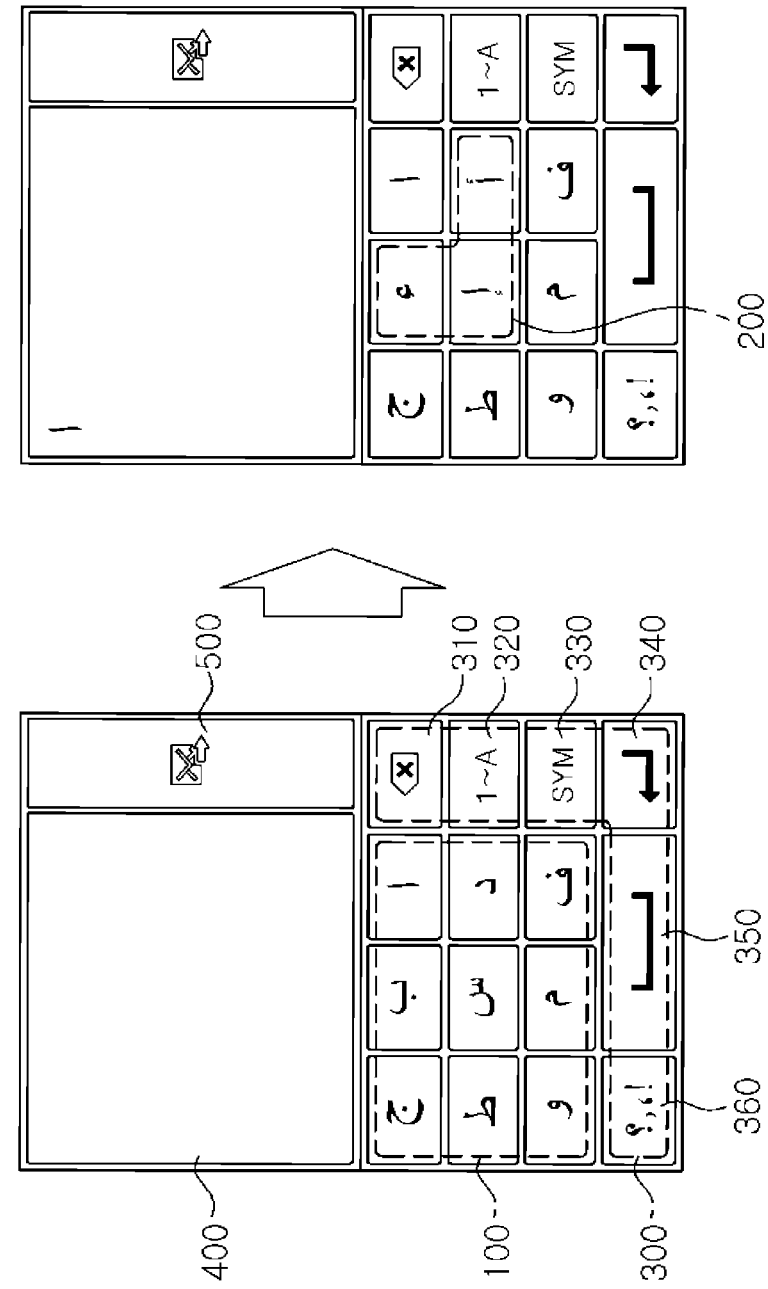
FIG. 1 is a view of the conventional key pad array of Arabic letters.

Referring FIGS. 11 and 13, Farsi language uses almost all the Arabic letters used in Arabic language, but further uses (پ), (چ), (ژ), (ك), (گ). Meanwhile, referring FIGS. 1 and 15, Urdu language uses almost all the Arabic letters used in Farsi language, but further uses (ط), (د), (ر), (ه), (ـة). And Arabic language uses (ك) which is not used in Farsi language nor Urdu language.

Considering the above fact that each languages uses some Arabic letters that are not used in the other pan-Arab languages, it is preferable that only the usable main letters of the Arabic language selected by the language selection key 117 should be assigned on the main letter area 111.

Figure 12:
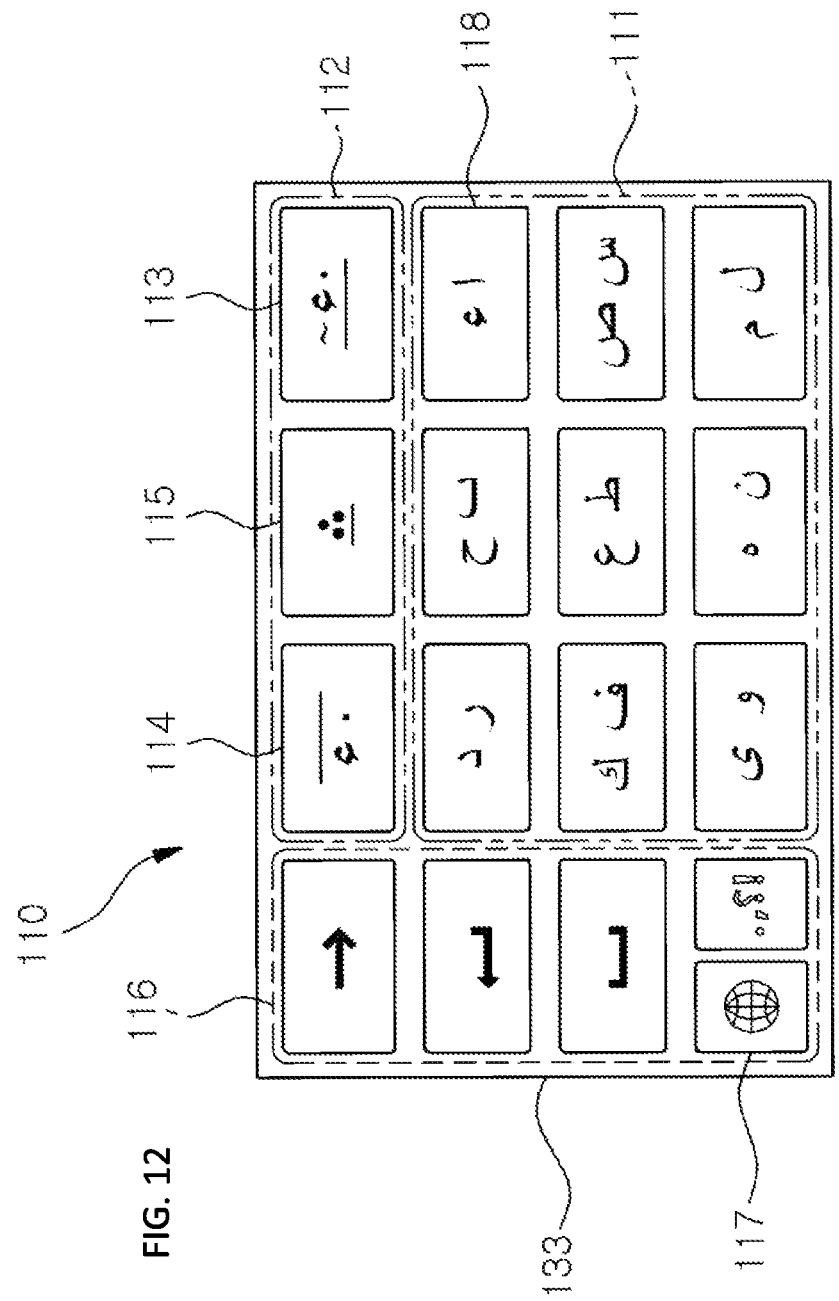
FIG. 12 is a view of the key pad layout of the embodiment of FIG. 11

In this respect, if Arabic language is selected by the language selection key 117, as shown in FIGS. 11 and 12, the main letters can comprise 18 letters including (ا), (ب), (ح), (د), (ر), (س), (ص), (ط), (ع), (ف), (ق), (و), (ك), (ل), (م), (ن), (ه), (ء), (ى) which are extracted from Arabic letters used in Arabic language.

Figure 14:
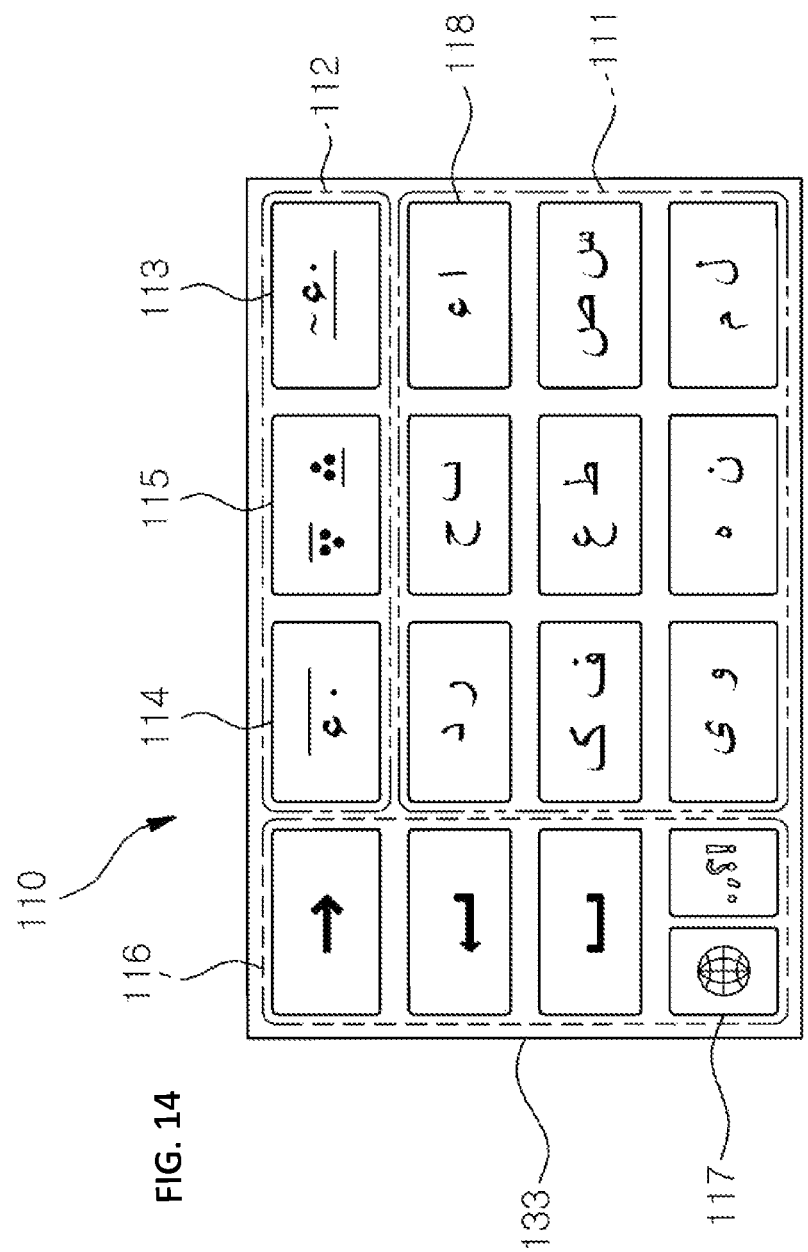
FIG. 14 is a view of the key pad layout of the embodiment of FIG. 13

If Farsi language is selected by the language selection key 117, as shown in FIGS. 13 and 14, the main letters can comprise 18 letters including (ا), (ب), (ح), (د), (ر), (س), (ص), (ط), (ع), (ف), (و), (ك), (ل), (م), (ن), (ه), (ء), (ى) which are extracted from Arabic letters used in Farsi language.

If Urdu language is selected by the language selection key 117, as shown in FIGS. 15 and 16, the main letter can comprise 18 letters including (ا), (ب), (ح), (د), (ر), (س), (ص), (ط), (ع), (ف), (و), (ك), (ل), (م), (ه), (ه), (ى), (ـة) which are extracted from Arabic letters used in Urdu language.

In this case, if inputted subscripts are restricted to those which can be grammatically combined with the corresponding main letter from Arabic letters of the language selected by the language selection key 117, so only the subscripts which could be added in the actual derived letters are displayed, the number and time of key operation can be more reduced.

The scope of the invention should not be restricted by the above mentioned preferred embodiment and the accompanied drawings, and various changes and modifications will be possible within the spirit of the invention defined by the claims by the ordinary skilled man in this field, which will also be included within the scope of the invention.

The invention claimed is:

1. An input device for Arabic letters including Arabic, Farsi and Urdu, which comprises:
  a key pad which includes a main letter area on which a plurality of main letters being common letter parts commonly included in Arabic consonant letters are assigned in a fixed position of the key pad and a subscript area on which a plurality of subscripts being added on each of the plurality of main letters to form complete consonant letters are assigned in a fixed position of the key pad, and outputs a corresponding letter input signal according to a user's touch operation;
  a controller which outputs display control signals to display the complete consonant letters combined by a selected main letter and a selected subscript according to the letter input signal; and
  a display which displays each Arabic consonant letter on a display window according to the display control signals from the controller,
  wherein the subscripts are divided into upper subscripts which are added on an upper part of the plurality of main letters and lower subscripts which are added on a lower part of the plurality of main letters, and the subscript area is divided into an upper subscript key on which the upper subscripts are assigned and a lower subscript key on which the lower subscripts are assigned, and the controller controls so that the upper subscripts change sequentially according to a predetermined order based on a key operating number for the upper subscript key and controls so that the lower subscripts change sequentially according to a predetermined order based on a key operating number for the lower subscript key, wherein the upper subscripts including (ط), (ع), (~), (●), (●●), (●●●) are divided into general upper subscripts including (ط), (ع), (~), (●), (●●) and a three point upper subscript of (●●●), and the lower subscripts including (ع), (●), (●●), (●●●) are divided into general lower subscripts including (ع), (●), (●●) and a three point lower subscript of (●●●), and the subscript area is divided into the upper subscript key to input the general upper subscripts sequentially, the lower subscript key to input the general lower subscripts sequentially, and a three point subscript key to input the three point upper subscript and the three point lower subscript alternately, wherein the input device for Arabic letters further includes a position detecting unit detecting whether the display is positioned vertically or horizontally and outputting a detected position signal, and the key pad comprises a touch panel and is shown on the display window, and the controller controls to display the key pad in a vertical array mode or a horizontal array mode selectively according to the detected position signal, and the vertical array mode includes the main letter area having 3×3 key array in which three pairs of two main letters are assigned on each key respectively and the subscript area disposed adjacent to the main letter area and having 1×3 or 3×1 key array in which the upper subscript key, the lower subscript key and the three point subscript key are assigned on each key respectively, and the horizontal array mode includes the main letter area having 6×3 key array in which each main letter is assigned on each key respectively and the subscript area disposed adjacent to one or both side of the main letter area and having the upper subscript key, the lower subscript key and the three point subscript key respectively.

2. The input device for Arabic letters of claim 1, wherein the main letters comprise 18 letters (ا), (ب), (ح), (ا), (ـم), (ر), (ص), (ط), (ع), (ك), (ل), (م), (ن), (و), (ه), (ء), (ى), (ـ) which are extracted from 46 Arabic consonant letters covering all letters of Arabic language, Farsi language and Urdu language.

3. An input device for Arabic letters including Arabic, Farsi and Urdu, which comprises:
a key pad which includes a main letter area on which a plurality of main letters being common letter parts commonly included in Arabic consonant letters as a same or similar shape are assigned in a fixed position of the key pad and a subscript area on which a plurality of subscripts being added on each of the plurality of main letters to form complete consonant letters are assigned in a fixed position of the key pad, and outputs a corresponding letter input signal according to a user's touch operation;
a controller which outputs display control signals to display complete consonant letters formed by combining a selected main letter and a selected subscript; and
a display which displays each Arabic consonant letter on a display window according to the display control signals from the controller,
wherein the subscripts are divided into upper subscripts which are added on an upper part of the plurality of main letters and lower subscripts which are added on a lower part of the plurality of main letters, and the subscript area is divided into an upper subscript key on which the upper subscripts are assigned and a lower subscript key on which the lower subscripts are assigned, and the controller controls so that the upper subscripts change sequentially according to a predetermined order based on a key operating number for the upper subscript key and controls so that the lower subscripts change sequentially according to a predetermined order based on a key operating number for the lower subscript key, wherein the upper subscripts including (ط), (ع), (~), (●), (●●), (●●●) are divided into general upper subscripts including (ط), (ع), (~), (●), (●●) and a three point upper subscript of (●●●), and the lower subscripts including (ع), (●), (●●), (●●●) are divided into general lower subscripts including (ع), (●), (●●) and a three point lower subscript of (●●●), and the subscript area is divided into the upper subscript key to input the general upper subscripts sequentially, the lower subscript key to input the general lower subscripts sequentially, and a three point subscript key to input the three point upper subscript and the three point lower subscript alternately, wherein the input device for Arabic letters further includes a position detecting unit detecting whether the display is positioned vertically or horizontally and outputting a detected position signal, and the key pad comprises a touch panel and is shown on the display window, and the controller controls to display the key pad in a vertical array mode or a horizontal array mode selectively according to the detected position signal, and the vertical array mode includes the main letter area having 3×3 key array in which three pairs of two main letters are assigned on each key respectively and the subscript area disposed adjacent to the main letter area and having 1×3 or 3×1 key array in which the upper subscript key, the lower subscript key and the three point subscript key are assigned on each key respectively, and the horizontal array mode includes the main letter area having 6×3 key array in which each main letter is assigned on each key respectively and the subscript area disposed adjacent to one or both side of the main letter area and having the upper subscript key, the lower subscript key and the three point subscript key respectively.

4. The input device for Arabic letters of claim 3, wherein the plurality of subscripts are divided into upper subscripts which are added on an upper part of the plurality of main letters and lower subscripts which are added on a lower part of the plurality of main letters, and the subscript area is divided into an upper subscript key on which the upper subscripts are assigned and a lower subscript key on which the lower subscripts are assigned, and the controller controls so that the upper subscripts change sequentially according to a predetermined order based on a key operating number of the upper subscript key and controls so that the lower subscripts change sequentially according to a predetermined order based on a key operating number of the lower subscript key.

5. The input device for Arabic letters of claim 4, wherein the controller controls that the plurality of subscripts are displayed in a predetermined sequence according to an operating number of the upper subscript key or the lower subscript key for a corresponding main letter, and only subscripts which can be grammatically combined with the corresponding main letter should be displayed sequentially.

\* \* \* \* \*